(12) United States Patent
Miyajima et al.

(10) Patent No.: US 6,478,341 B1
(45) Date of Patent: Nov. 12, 2002

(54) TUBE CLAMPING STRUCTURE

(75) Inventors: Atsuo Miyajima, Inuyama; Kazushige Sakazaki, Komaki, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/578,449

(22) Filed: May 26, 2000

(30) Foreign Application Priority Data

May 27, 1999 (JP) ............................................. 11-148040
May 12, 2000 (JP) ........................................ 2000-140833

(51) Int. Cl.[7] ............................................... F16L 33/00
(52) U.S. Cl. ........................................... 285/253; 285/55
(58) Field of Search ...................... 285/226, 55, 235, 285/233, 253, 252

(56) References Cited

U.S. PATENT DOCUMENTS

| | | | | |
|---|---|---|---|---|
| 3,633,947 A | * | 1/1972 | Nelson | ........................ 285/233 |
| 5,163,718 A | * | 11/1992 | Cannon | ........................ 285/226 |

FOREIGN PATENT DOCUMENTS

| | | |
|---|---|---|
| JP | 4-171391 | 6/1992 |
| JP | 6-221481 | 8/1994 |
| JP | 6-307583 | 11/1994 |
| JP | 6-307584 | 11/1994 |
| JP | 6-307585 | 11/1994 |
| JP | 8-294979 | 11/1996 |
| JP | 10-274363 | 10/1998 |
| WO | 94/29631 | * 12/1994 ................. 285/226 |

* cited by examiner

*Primary Examiner*—Eric K. Nicholson
(74) *Attorney, Agent, or Firm*—Oblon, Spivak, McClelland, Maier & Neustadt, P.C.

(57) ABSTRACT

Tube 1 is comprised with an engaging end portion 11 formed on one end thereof and an annular concave portion 1b formed on the engaging end portion at a position remote from the end surface in the axial direction; an elastic sealing member 2 is comprised with an inner tube 21, which has an outer peripheral surface to be fitted to an inner peripheral surface 13 of the tube, and an outer tube portion 22, which is provided at one end side of the inner tube portion that is bent outwardly over as to cover one end surface of the engaging end portion while covering the outer peripheral surface of the engaging end portion 11; and an elastic sealing member 2, which comprises an annular concave portion 2b formed on the inner peripheral surface of the inner tube portion and an annular protrusion 2a matching the annular concave portion 1b of the tube formed on the outer peripheral surface, is inserted into the tube. Thereafter, clamping of the outer periphery of the outer tube portion is performed through a clamping member 4 by inserting the tube with the elastic sealing member being inserted thereto until the annular protrusion 3a of the opposing member is fitted to the annular concave portion 2b.

21 Claims, 5 Drawing Sheets

TUBE CLAMPING STRUCTURE

BACKGROUND OF THE INVENTION

The present invention relates to a tube clamping structure in which a tube and a tubular opposing member such as a rigid pipe made, for instance, of resin, metal, etc. are connected in a fluid-tight condition. Such a structure is favorably used for clamping structures between tubes and metallic pipes for use in automobiles calling for resistance to gasoline.

A conventionally known clamping structure of this type is disclosed in Japanese Patent Unexamined Publication No. 4-171391 (1992). More particularly, this is a clamping structure as illustrated in FIG. 10 between a thin wall tube 7 and a metallic tube 5 arranged in the following manner: a connecting portion of the thin wall tube 7 is fitted to an outer periphery portion of a connecting portion of the metallic tube 5; a protecting sleeve 6, which is made of the same material as the thin wall tube 7, is fitted to an outer periphery portion of the connecting portion of the thin wall tube 7; and the outer periphery portion of the connecting portion of the protecting sleeve 6 is swaged by a metallic sleeve 8 at least at two spots that are located remote from each other. The structure is further arranged in that at least one groove 5a is provided on the outer periphery portion of the metallic tube 5, the groove 5a being located on either one of the at least two swaging portions and assuming a dimension such that its depth dimension is smaller than half a thickness of the thin wall tube and its width dimension is smaller than a width dimension of the swaging portion located at one spot of the metallic sleeve 8.

However, since relatively hard resin was employed for the thin wall tube 7, drawbacks were presented in that sealing properties between an inner peripheral surface of the tube and an outer peripheral surface of the metallic tubes 5 were inferior. While structures are accordingly employed for strongly swaging the sleeve from the outer periphery in order to improve sealing properties, it is difficult to employ such structures in assembly worksites for automobiles or the like, since such swaging operations need to be performed by using a swaging device. Problems of leakage of fluid were also presented that were due to creases generated in the course of swaging.

SUMMARY OF THE INVENTION

The present invention has been made in view of these circumstances, and it is a first object of the present invention to provide a tube connecting structure capable of easily improving sealing properties between tubes and tubular opposing members in addition to enabling easy connection at any spot, e.g. assembly worksites for automobiles. It is another object of the present invention to provide a tube connecting structure for preventing leakage of fluid owing to creases generated in the course of swaging.

For achieving the above objects, the present invention provides a tube clamping structure for connecting an opposing member to one end of a tube comprising:

a tube extending from one end to another end; an engaging end portion being formed at one end of the tube and extending in an axial direction, and including an annular concave portion that is formed at an inner peripheral surface thereof and that is located to be remote from an one end surface in the axial direction; a tubular elastic sealing member inserted and attached to the engaging end potion of the tube; a tubular opposing member comprised with an inserting end portion that can be inserted into an inner periphery of the elastic sealing member and including an annular protrusion projecting outward from its outer peripheral surface in a radial direction and being located remote from a tip end thereof; and a clamping member annularly disposed on the outer periphery of the tube, wherein the elastic sealing member is comprised of an inner tube portion with an outer peripheral surface that is fitted to an inner peripheral surface of the engaging end portion of the tube and an outer tube portion provided at one end side of the inner tube portion, being bent outwardly over as to cover the one end surface of the engaging end portion while covering the outer peripheral surface of the engaging end portion, wherein the outer peripheral surface of the inner tube portion is comprised with an annular fitting convex portion matching the annular concave portion of the tube, and the inner peripheral surface thereof with an annular fitting concave portion for fitting the annular protrusion of the opposing member, and wherein the clamping member is clamped on the outer periphery of the outer tube portion with the inserting end portion of the opposing member being inserted and attached to the inner peripheral surface of the tubular elastic sealing member.

In the present invention, the opposing member is held against the tubular elastic sealing member so as to be immovable in the axial direction owing to the above-described arrangement in which the tube is comprised with the engaging end portion with an annular concave portion being formed at a position being remote from one end surface thereof in the axial direction, in which the tubular elastic sealing member is comprised of an inner tube portion with an outer peripheral surface and fitted to an inner peripheral surface of the engaging end portion of the tube, and an outer tube portion provided at one end side of the inner tube portion, being bent outwardly over as to cover one end surface of the engaging end portion while covering the outer peripheral surface of the engaging end portion, and in which the outer peripheral surface of the inner tube portion is comprised with an annular protrusion matching the annular concave portion of the tube and the inner peripheral surface thereof with a fitting concave portion for fitting the annular protrusion of the opposing member. The tubular elastic sealing member is further held against the tube so as to be immovable in the axial direction.

One end of the tube is pinched and held between the inner tube portion and the outer tube portion of the elastic sealing member and is clamped by a clamping member from the outer periphery of the outer tube portion. Thus, it is possible to prevent the opposing member from slipping off the tube.

It is also possible to provide an annular convex portion at an intermediate portion of the engaging end portion as to project outward from the outer peripheral surface of the engaging end portion in the radial direction. The annular convex portion serving to secure creases that are generated at the engaging end portion in the course of clamping, it is enabled to improve sealing properties between the engaging end portion of the tube, the inner tube portion of the elastic sealing member, and the inserting end portion of the opposing member.

It is alternatively possible that employ an arrangement in which the annular concave portion formed on the inner peripheral surface of the engaging end portion is formed at an intermediate portion of the engaging end portion, in which the clamping member is disposed on a location closer to the one end than the annular convex portion, and in which the inner tube portion of the elastic sealing member is provided with an extension extending inward from the annular fitting convex portion of the inner tube portion in the axial direction. By the provision of the extension at the inner tube portion of the elastic sealing member, sealing between both end of the engaging end portion can be reliably performed without being affected through clamping with the extension being located remote from the portion at which clamping through the clamping member is performed.

A portion of the engaging end portion of the tube ranging from the annular concave portion to the one end surface may be formed to assume a wave-shaped tubular portion with waveforms being formed in a peripheral direction. With this arrangement, it is possible to secure sealing properties at the clamping portion and to reliably prevent leakage of fluid because generation of creases can be smoothed out through the wave-shaped tubular portions at portion where clamping of the clamping member is performed.

At least one slit extending from the one end surface in the direction of the annular concave portion may be provided at the engaging end portion of the tube in the peripheral direction thereof. With this arrangement, it is possible to secure sealing properties at the clamping portion and to reliably prevent leakage of fluid because generation of creases can be smoothed out through the slits where clamping of the clamping member is performed. Note that it is easier to form slits rather than wave-shaped tubular portions.

An inner end portion of the inner tube portion in the axial direction may be branched at an intermediate position in a thickness direction to comprise an annular outer branch portion and an inner branch portion that respectively extend outward and inward with respect to the radial direction in an inclined manner. With this arrangement, sealing properties can be favorably secured with the inner tube portion closely contacting the engaging end portion at the outer branch portion, while the inner branch portion closely contacts the opposing member for favorably securing sealing properties.

The inner tube portion may be alternatively comprised of a base portion extending outward in the axial direction from the annular fitting concave portion and an extension extending inward in the axial direction from the fitting concave portion, wherein the base portion assumes an inner diameter that is slightly larger than an outer diameter of the inserting end portion of the opposing member while the extension assumes an inner diameter that is slightly smaller than the outer diameter of the inserting end portion of the opposing member. With this arrangement, it is possible to readily insert the inserting end portion to the base portion while improving sealing properties between the elastic sealing member and the inserting end portion in the extension.

It is also possible to provide annular projecting sealing portions that coaxially project outward and inward in radial directions on a plurality of spots on the outer peripheral surface and the inner peripheral surface of the extension of the inner tube portion in the axial direction. With this arrangement, sealing properties can be favorably secured with the projecting sealing portion projecting outward of the inner tube portion closely contacting the engaging end portion, and further favorably securing sealing properties with the projecting sealing portion projecting inward of the inner tube portion closely contacting the opposing member.

The tube may be arranged either as a single-layered structure of resin, a double-layered structure with an inner layer of resin, conductive resin or metallic film and an outer layer of resin, or a triple-layered structure with an adhesive layer being formed intermediate of the inner layer and outer layer. With this arrangement, it is enabled to select tube structures in accordance with various purposes.

The elastic sealing member of the present invention may be alternatively arranged to comprise an enveloping portion covering only the one end surface of the engaging end portion of the tube and an inner tube portion including an outer peripheral surface that is fitted to the inner peripheral surface of the engaging end portion, an annular fitting convex portion formed on the outer peripheral surface of the inner tube portion that matches the annular concave portion of the tube, and an annular fitting concave portion formed on the inner peripheral surface of the inner tube portion that fits the annular protrusion of the opposing member, wherein the clamping member is clamped on the outer periphery of the engaging end portion when employing such a structure. By omitting the outer tube portion of the elastic sealing member in this manner, it is possible to readily insert the elastic sealing member to the tube while still exhibiting the above effects.

DETAILED DESCRIPTION OF PREFERRED EMBODIMENTS

Figure 1:
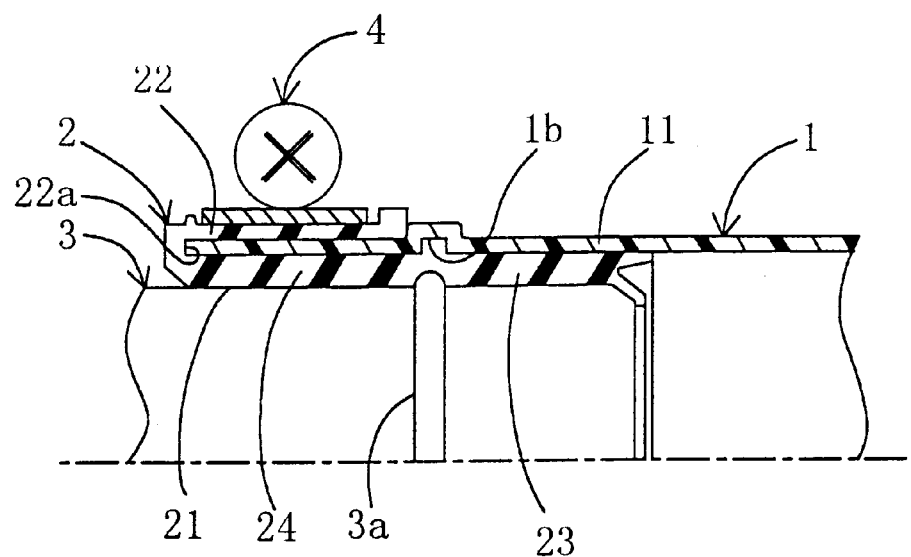
FIG. 1 is a sectional view of a main portion of one embodiment of the tube clamping structure of the present invention with a lower half of the structure being omitted.
Figure 2:
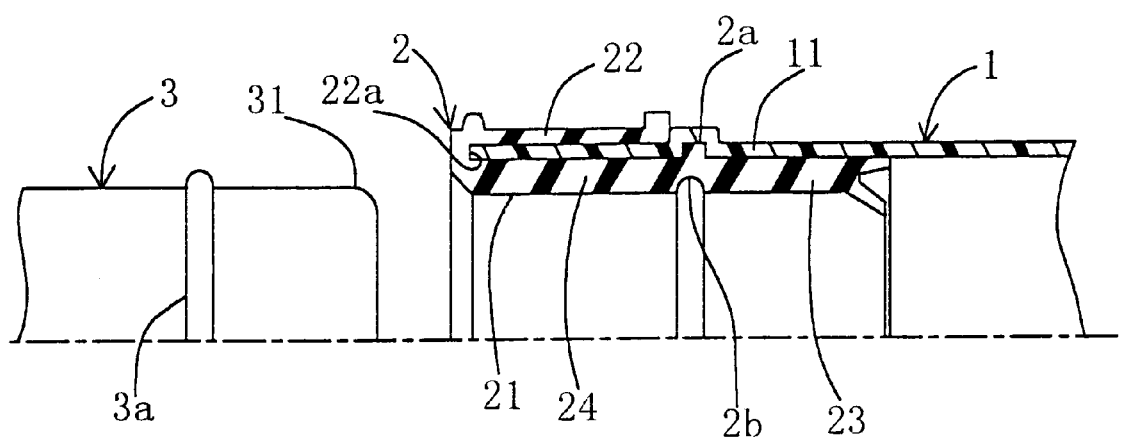
FIG. 2 is a sectional view of a main portion with the lower half being omitted for explaining methods for clamping by using the structure of FIG. 1.

As illustrated in FIG. 2, an opposing member 3 is inserted into an engaging end portion 11 formed at one end of a tube 1 with an elastic sealing member 2 comprised of an inner tube portion 21 and an outer tube portion 22 being fitted thereto, and an outer periphery of the elastic sealing member is clamped by a clamping member 4 such as a clamp to thereby connect the tube and the opposing member in a fluid-tight manner. The structure of the tube 1 may be (1) a single-layered structure of PA6, PA12, PA11, (2) a double-layered structure with an inner layer made of ETFE, THV (a copolymer of TFE, HFP, VDF), PBN, PBT, EVOH, PVDF etc., these materials being imparted with conductivity, metallic foils of steel, stainless steel, aluminum etc., and an outer layer made of resin such as PA6, PA12, PA11, PE, PP etc., and (3) a triple-layered structure with an adhesive layer being provide intermediate of the double-layered structure of above (2).

The tube clamping structure of the present invention will now be explained in details.

The tube is formed through blow molding or corrugated molding, is comprised with an engaging end portion at one end thereof to which an elastic sealing member is attachable, and is formed with an annular protuberance with a concave portion being formed on its inner peripheral surface and with an projecting portion formed on an outer peripheral surface thereof. The elastic sealing member is arranged to provide a fit by inserting an opposing member therein, and is comprised with an outer tube portion fitting to an outer peripheral surface of the engaging end portion and with an inner tube portion fitting to an inner peripheral surface of the engaging end portion. The inner tube portion is comprised with an annular protuberance with an annular fitting concave portion formed on an inner peripheral surface thereof and an annular fitting convex portion formed on an outer peripheral surface thereof, and wherein the annular protuberance forms a boundary between a base portion on the end surface side and an extension on the opposite side. The opposing member, which may be inserted into the elastic sealing member, is a metallic tubular object with an annular protrusion formed at one end thereof for fitting to the concave portion of the elastic sealing member. A metallic clamp and the rest that is annularly clamped on an outer periphery of the outer tube portion may be employed as the clamping member.

Figure 3:
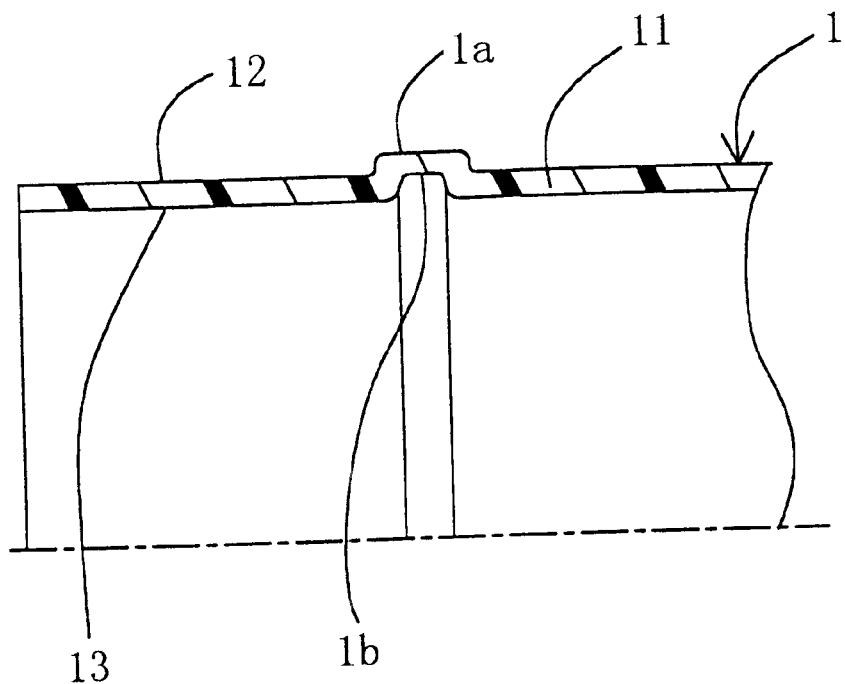
FIG. 3 is a sectional view of a main portion of the structure with the lower half of a tube as used in the structure of FIG. 1 being omitted.

Embodiments of the present invention will now be explained in details based on the drawings. The present invention relates to a tube clamping structure for connecting an opposing member 3 such as pipe to one end of a tube 1, and a preferred embodiment of the present invention will explained based on FIGS. 1 to 4. In the drawings, 1 denotes a tube, as illustrated in FIG. 3, the tube 1 being provided with an engaging end portion 11 at one end thereof that extends in an axial direction to suit a length of an inserting end portion 31 of an opposing member 3 as it will be explained later, wherein the engaging end portion 11 is formed with an annular concave portion 1b on an inner peripheral surface 13 of the engaging end portion 11 at an intermediate position remote from the end surface in the axial direction. It is preferable that an annular convex portion 1a be integrally formed on an outer peripheral surface 12 through blow molding to correspond to this annular concave portion 1b.

A tubular elastic sealing member 2 is inserted from the one end surface into the engaging end potion 11 of the tube 1 to be placed at a specified position to be immovable in the axial direction. The elastic sealing member 2 is comprised, as illustrated in FIGS. 2 and 4, of an inner tube portion 21 having an outer peripheral surface that is fitted to an inner peripheral surface 13 of the tube 1, and a cap-like outer tube portion 22 integrally formed to one end side of the inner tube portion 21 that is bend outwardly over as to cover an end surface of the engaging end portion 11 and to cover the outer peripheral surface 12 of the engaging end portion 11.

The inner tube portion 21 is arranged in that an inner peripheral surface thereof is formed with an annular fitting concave portion 2b into which an annular protrusion 3a of the opposing member 3 fits, and in that an outer peripheral surface thereof is formed with an annular fitting convex portion 2a as illustrated in FIG. 2 to match the annular concave portion 1b of the tube 1. The inner tube portion 21 is further comprised of an extension 23 extending inward from the annular fitting convex portion 2a in the axial direction and of a base portion 24 extending outward from the annular fitting convex portion 2a in the axial direction.

Figure 4:
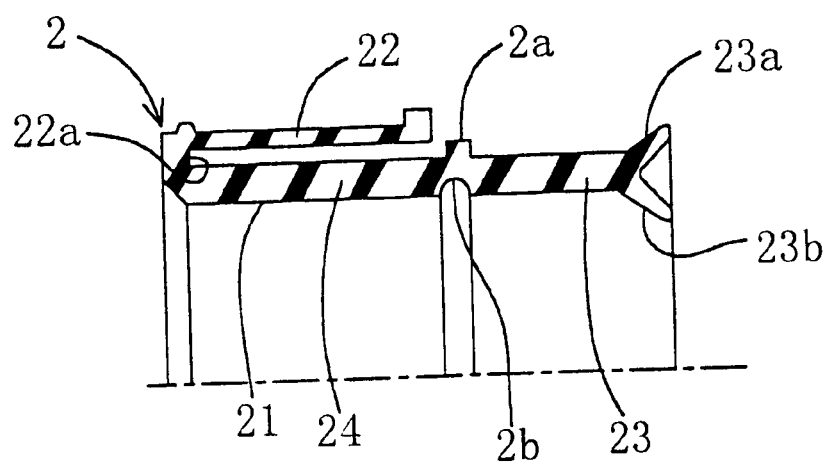
FIG. 4 is a sectional view of the structure with the lower half of an elastic sealing member as used in the structure of FIG. 1 being omitted.

An inner end portion of the extension 23 in the axial direction branches at an intermediate position in a thickness direction as illustrated in FIG. 4 to form annular outer branch portion 23a and an inner branch portion 23b extending towards outward and inward in radial directions and to be inclined at specified angles with respect to an axis. With this arrangement, the inner tube portion 21 is capable of securing favorable sealing properties through close contact between the outer branch portion 23a and the engaging end portion 11 while further securing favorable sealing properties through close contact between the inner branch portion 23b and the opposing member 3.

The inserting end portion 31 of the opposing member 3 is placed into the inner peripheral surface of the tubular elastic sealing member 2. As illustrated in FIG. 2, the opposing member 3 is arranged in that an annular protrusion 3a matching the annular fitting concave portion 2b of the elastic sealing member 2 is formed at the inserting end portion 31 at a position remote from a tip end thereof.

Methods for assembling the tube clamping structure of the above-described configuration will now be explained. First, the tubular elastic sealing member 2 is inserted from the end surface side of the engaging end portion 11 of the tube 1 such that the engaging end portion 11 is fitted between the inner tube portion 21 and the outer tube portion 22 of the elastic sealing member, and the annular fitting convex portion 2a of the elastic sealing member 2 is fitted to the annular concave portion 1b formed in the tube 1. It is preferable that the folded end surface 22a of the outer tube portion 22 covering the outer periphery of the engaging end portion 11 abuts the one end surface of the engaging end portion 11 on this occasion.

Thereafter, a loose clamping member 4 is placed on the outer periphery of the outer tube portion 22 of the elastic sealing member 2; the tubular opposing member 3 is inserted from the folded end surface side of the outer tube portion 22; the annular protrusion 3a of the opposing member 3 is fitted to the annular concave portion 2b of the elastic sealing member 2; and by clamping through the clamping member 4, the tube clamping structure is completed.

It is preferable to set an inner diameter of the base portion 24 of the inner tube portion 21 of the elastic sealing member 2 to be larger than the outer diameter of the inserting end portion 31 of the opposing member 3 to enable insertion of the inserting end portion 31 with ease. On the other hand, sealing properties between the elastic sealing member 2 and the inserting end portion 31 can be improved by setting an inner diameter of the extension 23 of the inner tube portion 21 to be smaller than an outer diameter of the inserting end portion 31.

Figure 5:
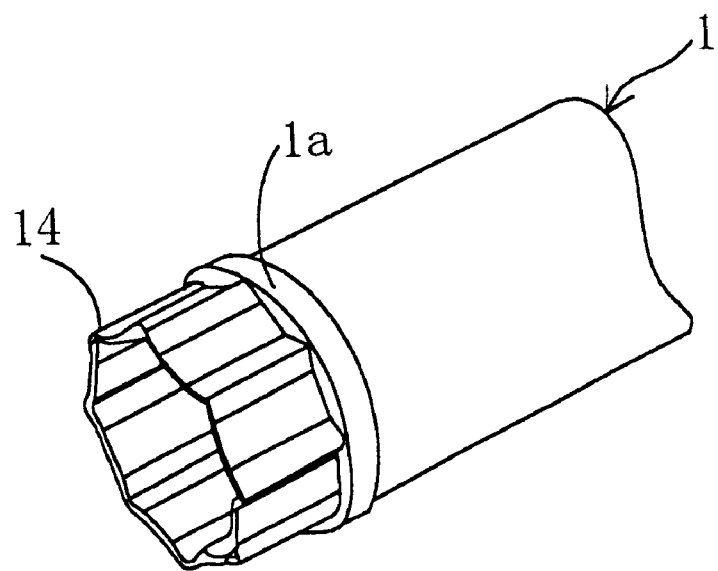
FIG. 5 is a perspective view for explaining another embodiment (Modified Form 1) of the present invention.
Figure 6:
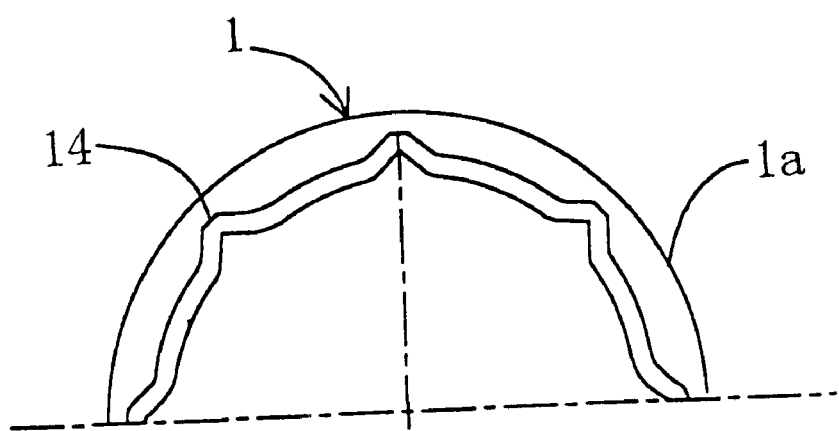
FIG. 6 is a front view seen from the left of FIG. 5 with the lower half of the structure being omitted.

In a Modified Form 1 of the present embodiment, the tube 1 as illustrated in FIGS. 5 and 6 is of similar arrangement as that illustrated in FIG. 3 except for the point that a portion of the engaging portion 11 ranging from the annular concave portion 1b to the end surface is formed as a wave-shaped tubular portion 14 with waveforms being formed in a peripheral direction. The provision of the wave-shaped tubular portion 14 enables it to insert the opposing member 3 with ease. By the provision of the wave-shaped tubular portion 14, generation of creases at the engaging end portion 11 can be smoothed out where clamping is performed by the clamping member 4 such that sealing properties may be secured at the clamping portion and leakage of fluid may be prevented.

Figure 7:
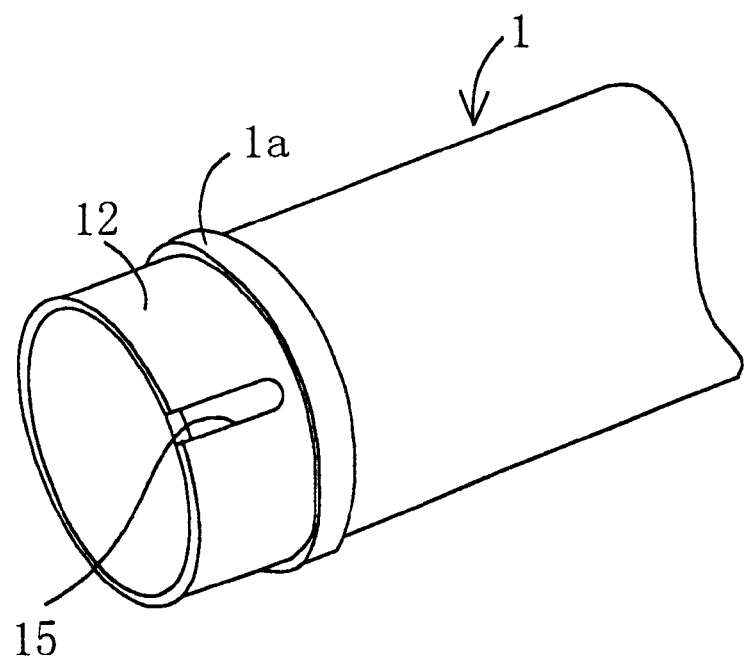
FIG. 7 is a perspective view for explaining another embodiment (Modified Form 2) of the present invention.

In a Modified Form 2 of the present embodiment, the tube 1 as illustrated in FIG. 7 is provided with a slit 15 at one spot of the engaging end portion 11 in the peripheral direction to extend in an axial direction from the one end surface of the engaging end portion 11 towards the annular convex portion 1a. The remaining arrangement is similar to that as illustrated in FIG. 3. The provision of such a slit 15 enables it to insert the opposing member 3 with ease. Moreover, generation of creases can be smoothed out by the provision of the slit 15 where clamping is performed by the clamping member 4 such that sealing properties may be secured at the clamping portion and leakage of fluid may be prevented. Note that it is easier to form the slit 15 rather than forming the above-described wave-shaped tubular portion 14. It should further be noted that the slit 15 might also be formed not only on one spot in the peripheral direction but also on a plurality of spots.

Figure 8:
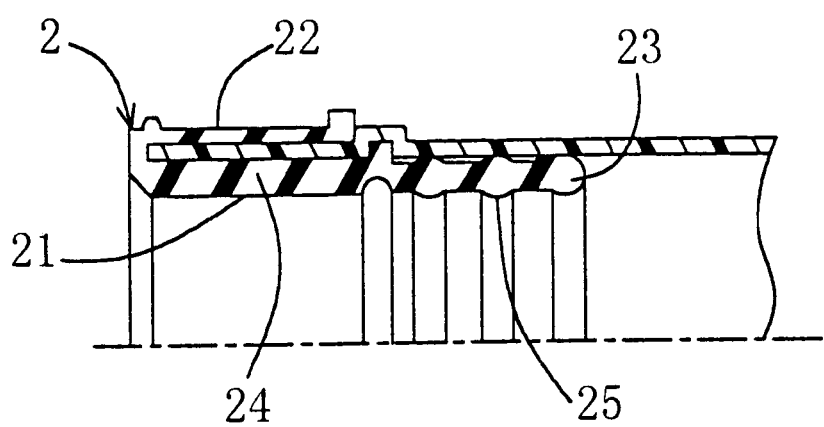
FIG. 8 is a sectional view of a main portion (of the structure) for explaining another embodiment (Modified Form 3) of the present invention with the lower half of the structure being omitted.

In a Modified Form 3 of the present embodiment, the elastic sealing member 2 as illustrated in FIG. 8 is arranged in that annular projecting sealing members 25, which coaxially project outward and inward in radial directions, are formed at a plurality of spots in the axial direction on the outer peripheral surface and the inner peripheral surface of the extension 23 of the inner tube portion 21. The remaining arrangement is identical to that as illustrated in FIG. 4. With this arrangement, the projecting sealing portions 25 projecting outward from the inner tube portion 21 closely contact the engaging end portion 11 to favorably secure sealing properties, while the projecting sealing portions 25 projecting inward closely contact the opposing member 3 to favorably secure sealing properties.

Figure 9:
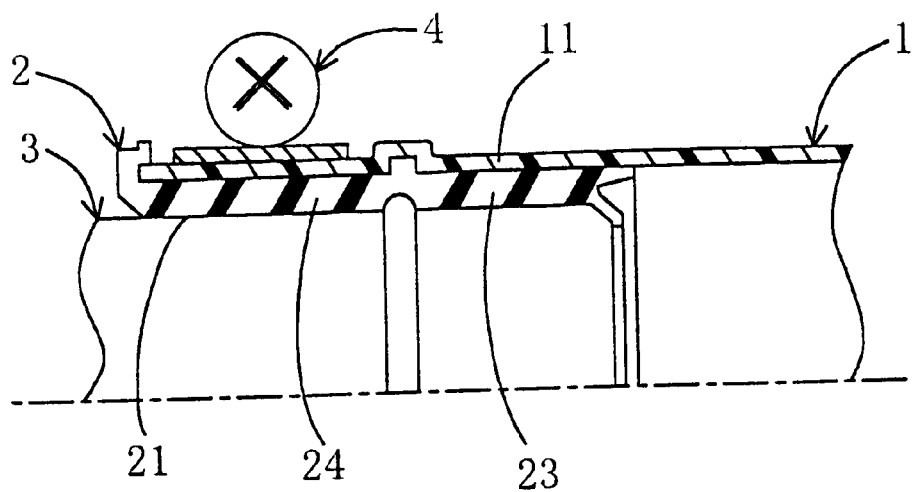
FIG. 9 is a sectional view of a main portion (of the structure) for explaining another embodiment (Modified Form 4) of the present invention with the lower half of the structure being omitted.
Figure 10:
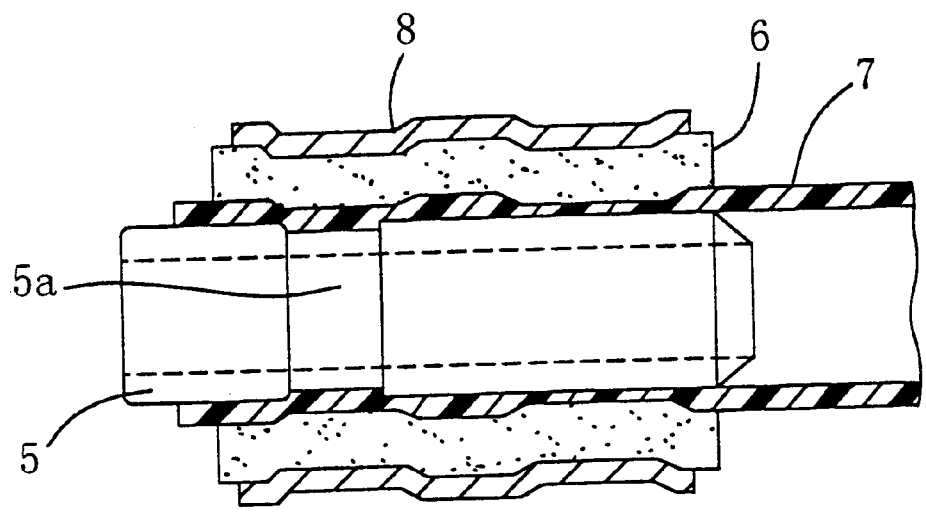
FIG. 10 is a sectional view of a main portion of the structure for explaining a prior art clamping structure.

In a Modified Form 4 of the present embodiment, the elastic sealing member 2 as illustrated in FIG. 9 is of similar arrangement as that as illustrated in FIG. 4 expect for the point that the outer tube portion 22 of the above-described forms has been omitted. The elastic sealing member 2 can be easily inserted into the tube 1 by omitting the outer tube portion 22 of the elastic sealing member 2 in this manner.

While embodiments of the present invention have been explained above in details, these embodiments are merely illustrative, and the present invention may be embodied in several forms without departing from the spirit of essential characteristics thereof.

What is claimed is:

1. A tube clamping structure for connecting an opposing member to one end of a tube comprising:

an engaging end portion being formed at the one end of said tube, extending in an axial direction, and including an annular concave portion that is formed at an inner peripheral surface at an intermediate position in the axial direction;

a tubular elastic sealing member including an inner tube portion with an outer peripheral surface that is fitted to an inner peripheral surface of the engaging end portion of said tube, and an outer tube portion that is provided at one end side of said inner tube portion and that is bent outwardly over as to cover said one end surface of the engaging end portion while covering the outer peripheral surface of the engaging end portion, the outer peripheral surface of the inner tube portion including an annular fitting convex portion fitted into the annular concave portion of said tube, the inner peripheral surface of the inner tube portion including an annular fitting concave portion, the inner tube portion being provided with an extension extending inward from the annular fitting convex portion and the fitting concave portion in the axial direction;

a tubular opposing member including an inserting end portion that can be inserted into an inner periphery surface of the elastic sealing member, and including an annular protrusion that projects outward from its outer peripheral surface in the axial direction, that is located at an intermediate position of the inserting end portion in the axial direction and that is fitted to the fitting concave portion of said elastic sealing member; and a clamping member annularly disposed at the outer periphery of said engaging end portion, wherein said clamping member is clamped on the outer periphery of said outer tube portion with the inserting end portion of said opposing member being inserted and attached to the inner peripheral surface of said elastic sealing member, and annular projecting sealing portions are provided that coaxially project outward and inward in radial directions on a plurality of spots on the outer peripheral surface and the inner peripheral surface of said extension of said inner tube portion in the axial direction.

2. The tube clamping structure as claimed in claim 1, wherein said inner tube portion is comprised of a base portion extending outward in the axial direction from said annular fitting concave portion and an extension extending inward in the axial direction from said fitting concave portion, and wherein an inner diameter of said base portion is slightly larger than an outer diameter of said inserting end portion of said opposing member while an inner diameter of said extension is slightly smaller than the outer diameter of the inserting end portion of the opposing member.

3. The tube clamping structure as claimed in claim 1, wherein a portion of said engaging end portion of said tube from said annular concave portion to said one end surface is formed as a wave-shaped tubular portion with waveforms formed in a peripheral direction.

4. The tube clamping structure as claimed in claim 1, further comprising at least one slit provided at said engaging end portion of the tube in the peripheral direction thereof to extend from said one end surface in a direction of said annular convex portion.

5. The tube clamping structure as claimed in claim 1, wherein the tube is arranged as one of a single-layered structure of resin, a double-layered structure with an inner layer of resin, conductive resin or metallic film and an outer layer of resin, or a triple-layered structure with an adhesive layer formed intermediate of said inner layer and outer layer.

6. The tube clamping structure as claimed in claim 1, further comprising an annular convex portion projecting outward from the outer peripheral surface of said engaging end portion in the radial direction, formed at the intermediate position of said engaging end portion, wherein said clamping member is disposed at a location closer to the one end than said annular convex portion.

7. The tube clamping structure as claimed in claim 1, wherein an inner end portion of said inner tube portion in the axial direction is branched at an intermediate position in a thickness direction to comprise an annular outer branch portion and an inner branch portion that respectively extend outward and inward with respect to the radial direction in an inclined manner.

8. The tube clamping structure as claimed in claim 7, wherein said inner tube portion is comprised of a base portion extending outward in the axial direction from said annular fitting concave portion and an extension extending inward in the axial direction from said fitting concave portion, and wherein an inner diameter of said base portion is slightly larger than an outer diameter of said inserting end portion of said opposing member while an inner diameter of said extension is slightly smaller than the outer diameter of the inserting end portion of the opposing member.

9. The tube clamping structure as claimed in claim 7, wherein a portion of said engaging end portion of said tube from said annular concave portion to said one end surface is formed as a wave-shaped tubular portion with waveforms formed in a peripheral direction.

10. The tube clamping structure as claimed in claim 7, further comprising at least one slit provided at said engaging end portion of the tube in the peripheral direction thereof to extend from said one end surface in a direction of said annular convex portion.

11. The tube clamping structure as claimed in claim 7, wherein the tube is arranged as one of a single-layered structure of resin, a double-layered structure with an inner layer of resin, conductive resin or metallic film and an outer layer of resin, or a triple-layered structure with an adhesive layer formed intermediate of said inner layer and outer layer.

12. The tube clamping structure as claimed in claim 7, further comprising an annular convex portion projecting outward from the outer peripheral surface of said engaging end portion in the radial direction, formed at the intermediate position of said engaging end portion, wherein said clamping member is disposed at a location closer to the one end than said annular convex portion.

13. A tube clamping structure for connecting an opposing member to one end of a tube comprising:

a tube extending from one end to another end;

an engaging end portion formed at the one end of said tube, extending in an axial direction, and including an annular concave portion that is formed at an inner peripheral surface at an intermediate position in the axial direction;

a tubular elastic sealing member including an envelope portion covering only one end surface of said engaging end portion of said tube and an inner tube portion with an outer peripheral surface that is fitted to an inner peripheral surface of the engaging end portion of said tube, the outer peripheral surface of the inner tube portion including an annular fitting convex portion fitted into the annular concave portion of said tube, the inner peripheral surface of the inner tube portion including an annular fitting concave portion, the inner tube portion being provided with an extension extending inward from the annular fitting convex portion and the fitting concave portion in the axial direction;

a tubular opposing member including an inserting end portion that can be inserted into an inner periphery of the elastic sealing member, and including an annular protrusion that projects outward from its outer peripheral surface in the axial direction, that is located at an intermediate position of the inserting end portion in the axial direction and that is fitted to the fitting concave portion of said elastic sealing member; and a clamping member annularly disposed at the outer periphery of said engaging end portion, wherein said clamping member is clamped an the outer periphery of said engaging end portion with the inserting end portion of said opposing member being inserted and attached to the inner peripheral surface of said elastic sealing member, and annular projecting sealing portions are provided that coaxially project outward and inward in radial directions on a plurality of spots an the outer peripheral surface and the inner peripheral surface of said extension of said inner tube portion in the axial direction.

14. The tube clamping structure as claimed in claim 13, wherein said inner tube portion is comprised of a base portion extending outward in the axial direction from said annular fitting concave portion and an extension extending inward in the axial direction from said fitting concave portion, and wherein an inner diameter of said base portion is slightly larger than an outer diameter of said inserting end portion of said opposing member while an inner diameter of said extension is slightly smaller than the outer diameter of the inserting end portion of the opposing member.

15. The tube clamping structure as claimed in claim 13, wherein a portion of said engaging end portion of said tube from the annular concave portion to said one end surface is formed as a wave-shaped tubular portion with waveforms formed in a peripheral direction.

16. The tube clamping structure as claimed in claim 13, further comprising at least one slit provided at said engaging end portion of the tube in the peripheral direction thereof to extend from said one end surface in a direction of said annular convex portion.

17. The tube clamping structure as claimed in claim 13, wherein the tube is arranged as one of a single-layered structure of resin, a double-layered structure with an inner layer of resin, conductive resin or metallic film and an outer layer of resin, or a triple-layered structure with an adhesive layer formed intermediate of said inner layer and outer layer.

18. The tube clamping structure as claimed in claim 13, further comprising an annular convex portion projecting outward from the outer peripheral surface of said engaging end portion in the radial direction, formed at the intermediate position of said engaging end portion, wherein said clamping member is disposed at a location closer to the one end than said annular convex portion.

19. The tube clamping structure as claimed in claim 13, wherein an inner end portion of said inner tube portion in the axial direction is branched at an intermediate position in a thickness direction to comprise an annular outer branch portion and an inner branch portion that respectively extend outward and inward with respect to the radial direction in an inclined manner.

20. The tube clamping structure as claimed in claim 19, wherein said inner tube portion is comprised of a base portion extending outward in the axial direction from said annular fitting concave portion and an extension extending inward in the axial direction from said fitting concave portion, and wherein an inner diameter of said base portion is slightly larger than an outer diameter of said inserting end portion of said opposing member while an inner diameter of said extension is slightly smaller than the outer diameter of the inserting end portion of the opposing member.

21. The tube clamping structure as claimed in claim 19, wherein a portion of said engaging end portion of said tube from the annular concave portion to said one end surface is formed as a wave-shaped tubular portion with waveforms formed in a peripheral direction.

* * * * *